(12) United States Patent
Khanduri

(10) Patent No.: US 8,767,687 B2
(45) Date of Patent: Jul. 1, 2014

(54) METHOD AND SYSTEM FOR ENDPOINT BASED ARCHITECTURE FOR VOIP ACCESS POINTS

(75) Inventor: Prakash Khanduri, Freehold, NJ (US)

(73) Assignee: Broadcom Corporation, Irvine, CA (US)

( * ) Notice: Subject to any disclaimer, the term of this patent is extended or adjusted under 35 U.S.C. 154(b) by 564 days.

(21) Appl. No.: 12/433,937

(22) Filed: May 1, 2009

(65) Prior Publication Data

US 2010/0278159 A1 Nov. 4, 2010

(51) Int. Cl.
*H04W 4/00* (2009.01)

(52) U.S. Cl.
USPC ............ 370/338; 370/328; 370/401; 370/466

(58) Field of Classification Search
USPC ............ 370/338, 389, 395.52, 328, 401, 466; 381/71.1; 455/41.2; 704/500; 709/231
See application file for complete search history.

(56) References Cited

U.S. PATENT DOCUMENTS

| | | | |
|---|---|---|---|
| 7,290,058 B2 * | 10/2007 | Zhu et al. | 709/231 |
| 2003/0125960 A1 * | 7/2003 | Chu et al. | 704/500 |
| 2007/0127499 A1 * | 6/2007 | Choi et al. | 370/395.52 |
| 2008/0123639 A1 * | 5/2008 | Saito et al. | 370/389 |
| 2009/0086987 A1 * | 4/2009 | Wihardja et al. | 381/71.1 |
| 2010/0130129 A1 * | 5/2010 | Chang et al. | 455/41.2 |

* cited by examiner

*Primary Examiner* — Brian D Nguyen
*Assistant Examiner* — Toan Nguyen
(74) *Attorney, Agent, or Firm* — Sterne, Kessler, Goldstein & Fox PLLC

(57) ABSTRACT

A VoIP access point may be operable to provide VoIP servicing to a plurality of wireless audio endpoint devices. The VoIP access point may extract VoIP audio data received via IP backbone and communicating the extracted audio data as non-VoIP formatted data to the wireless audio endpoint devices. In the uplink direction, the VoIP access point may receive non-VoIP formatted audio data from the wireless audio endpoint devices and pack the received data into IP packets for VoIP communication. The VoIP access point may also be operable to perform PCM encoding/decoding operations during VoIP servicing operations. The wireless audio endpoint devices may perform audio processing during VoIP communications via the VoIP access point. One or more intermediary communication devices may be utilized to route messaging between the VoIP access point and at least some of the wireless audio endpoint devices.

20 Claims, 8 Drawing Sheets

METHOD AND SYSTEM FOR ENDPOINT BASED ARCHITECTURE FOR VOIP ACCESS POINTS

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and system for endpoint based architecture for VoIP access points.

BACKGROUND OF THE INVENTION

The field of communication has seen dramatic growth the last few years, especially wireless communication. In today's world, most people use their wireless devices for various purposes, business and personal, on a constant and daily basis. Society is truly becoming a wireless one. A lot of wireless solutions have been introduced, and have made tremendous strides into everyday's life.

For example, the use of Wireless Personal Area Networks (WPAN) has gained a lot of popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

Other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become an almost absolute necessity in today's world. Many modern cellular technologies, including such technologies as GSM/GPRS/EDGE, UMTS, and CDMA2000, incorporate many features and capabilities. Most of today's cellular services include, in addition to voice calls, such features as text messaging, video streaming, and/or web browsing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system, and/or method is provided for endpoint based architecture for VoIP access points, substantially as shown in, and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for endpoint based architecture for VoIP access points. In various embodiments of the invention, an access point may be operable to provide voice-over-IP (VoIP) service to a plurality of wireless audio endpoint devices. The access point may be operable, in the downlink direction, to extract VoIP audio data received via IP packets, and to communicate the extracted audio data as non-VoIP formatted data to the wireless audio endpoint devices. Communications between the access point and the wireless audio endpoint devices may be performed via one or more wireless interfaces. Exemplary wireless interfaces may comprise Bluetooth, ZigBee, wireless local area network (WLAN), and/or Worldwide Inter-operability for Microwave Access (WiMAX) interfaces. In the uplink direction, the access point may be operable to receive non-VoIP formatted audio data from the wireless audio endpoint devices, and may pack the received data into IP packets for VoIP communication. The access point may also be operable to perform pulse-code modulation (PCM) based encoding/decoding operations during VoIP servicing operations by the access point. The wireless audio endpoint devices may perform audio processing during VoIP communications via the access point, comprising audio equalization, dynamic audio processing, automatic gain control (AGC) processing, Acoustic Echo Canceler (AEC) processing, and/or noise reduction. One or more intermediary communication devices may be utilized to route messages between the access point and at least some of the wireless audio endpoint devices. For example, a cellular device may be operable to route messages between the access point and the wireless audio endpoint devices, using Bluetooth and/or WLAN interfaces between the cellular device and the access point, and between the cellular device and the serviced wireless audio endpoint devices.

Figure 1A:
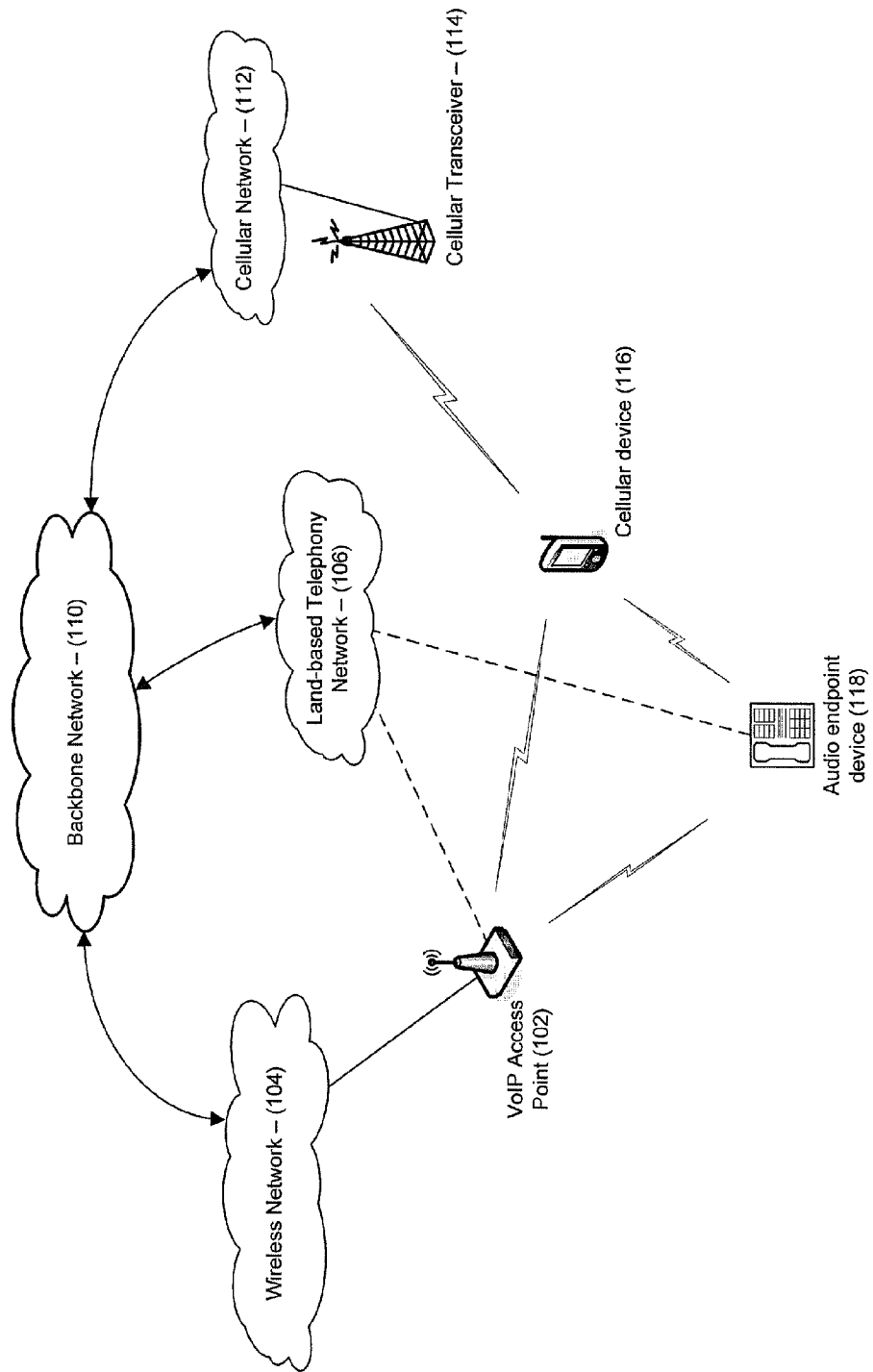
FIG. 1A is a block diagram that illustrates an exemplary system comprising a voice-over-IP (VoIP) access point, in accordance with an embodiment of the invention.

FIG. 1A is a block diagram that illustrates an exemplary system comprising a voice-over-IP (VoIP) access point, in accordance with an embodiment of the invention. Referring to FIG. 1, there is shown an access point 102, a wireless network 104, a land-based telephony network 106, a backbone network 110, a cellular network 112, a cellular transceiver 114, a cellular device 116, and an audio endpoint device 118.

The wireless network 104 may comprise suitable logic, circuitry, code, and/or interfaces that may enable implementing functional blocks corresponding to one or more wireless technologies. Exemplary wireless technologies may comprise WLAN (IEEE 802.11) and/or WiMAX (IEEE 802.16) architectures. Access to the wireless network 104 may be provided via a plurality of the access point 102. The access point 102 may comprise suitable logic, circuitry, code, and/or interfaces that may enable providing wireless access, via the wireless network 104, to one or more suitably capable wireless devices, for example the audio endpoint device 118, via a WiFi and/or Bluetooth link for example.

The land-based telephony network 106 may comprise suitable logic, circuitry, code, and/or interfaces that may be operable to provide wire-line based connectivity between local, and/or remote entities. For example, the land-based telephony network 106 may comprise a standard telephony network (POTS) that may enable telephony based connectivity between different nodes. The backbone network 110 may comprise suitable logic, circuitry, code, and/or interfaces that may be operable to provide overall system connectivity among local, and/or remote sub-networks. The backbone network 110 may provide, for example, overall connectivity that enables peer-to-peer internet protocol (IP) based communications. The backbone network 110 may be operable to interact with, and connect different wired, and/or wireless technologies. For example, the backbone network 110 may provide IP backbone connectivity and/or routing between different nodes linking wired, and/or wireless networks comprising WLAN networks, WiMAX networks, cellular networks, wired LAN networks, and/or land-based telephony networks.

The cellular network 112 may comprise suitable logic, circuitry, code, and/or interfaces that may provide and/or support communication based on one or more cellular technologies. Exemplary cellular technologies may comprise CDMA, WCDMA, CDMA2000, HSDPA, GSM, GPRS, EDGE, and/or UMTS. Access to the cellular network 112 may be provided via a plurality of the cellular transceiver 114. The cellular transceiver 114 may comprise suitable logic, circuitry, code, and/or interfaces that may be utilized to enable transmission, and/or reception of cellular based communications between the cellular network 112 and cellular capable devices, for example the cellular device 116, via the cellular link 116. For example, the cellular transceiver 114 may correspond to cellular towers, and/or base stations within a cellular communication system. The cellular device 116 may comprise suitable logic, circuitry, code, and/or interfaces that may enable cellular communications. The cellular device 116 may be operable to communicate with the cellular transceiver 114, for example, based on one or more cellular interface to provide network access via the cellular network 112 and/or the backbone network 110. In an exemplary aspect of the invention, the cellular device 116 may be operable to communicate with devices which may be located within proximity of the cellular device 116 via one or more supported wireless interfaces. For example, the cellular device 116 may be operable to utilize WLAN and/or WPAN interfaces to communicate with the access point 102 and/or the audio endpoint device 118.

The audio endpoint device 118 may comprise suitable logic, circuitry, interfaces, and/or code that may enable audio communication, wherein audio streams may be captured and/or played, processed, and communicated to a peer during voice calls. For example, the audio endpoint device 118 may correspond to a traditional phone and/or a mobile device that provide voice calling functionality. The audio endpoint device 118 may be operable to provide voice-over-IP (VoIP) services wherein audio data may be communicated via IP based networks. In an exemplary aspect of the invention, the audio endpoint device 118 may support one or more wireless protocols to enable communication with other devices that may be located near the audio endpoint device 118. The audio endpoint device 118 may support, for example, WLAN and/or WPAN interfaces to enable communication with the access point 102 and/or the cellular device 116. Exemplary WLAN interface may comprise 802.11 based interfaces, including, for example, WiFi links. WPAN interfaces may be based on standardized technologies that enable short range inter-device communications. Exemplary WPAN standards may comprise Bluetooth, ZigBee, and/or Ultra-Wideband (UWB).

In operation, the access point 102 may be operable to provide access to the wireless network 104, for a plurality of wireless devices which may require network connectivity to local and/or remote peers. The access point 102 may be operable to, for example, support wireless links, such as WLAN and/or WiMax links. The cellular device 116 may be operable to access the cellular network 112 at, for example, the cellular transceiver 114, via cellular links. The audio endpoint device 118 may be operable to enable communication of audio and/or multimedia communications. The audio endpoint device 118 may be used, for example, to support voice calls or to transfer multimedia information between a plurality of callers. The voice call routing may be provided, for example, via the land-based telephony network 106.

The audio endpoint device 118 may also be operable to support VoIP communication. Data communications, during VoIP sessions via the audio endpoint device 118 may be performed via direct connections, through the land-based telephony network 106 for example. The audio endpoint device 118 may also obtain network connectivity, to facilitate VoIP operations, indirectly via secondary devices. For example, the audio endpoint device 118 may be operable to communicate with the access point 102 to obtain network connectivity via the wireless network 104, and/or to enable the access point 102 to route packets exchanged during VoIP communication via the audio endpoint device 118. In this regard, the audio endpoint device 118 may be operable to utilize one or more of supported wireless and/or wired interfaces during VoIP operations. For example, the audio endpoint device 118 may utilize WLAN and/or WPAN links to communicate with the access point 102.

In various exemplary aspects of the invention, at least some of the processing that may need to be performed via the audio endpoint device 118 during VoIP communications may be delegated to, and/or performed by the access point 102. For example, during VoIP communications, some telephony and/or networking operations may be performed to enable establishing, utilize and/or terminate connections to enable communication of IP packets carrying the audio data or multimedia information between the peers in the VoIP call. Accordingly, the access point 102 may be used, for example, to perform these telephony and/or networking operations. The audio data that would otherwise be carried by the IP packets during VoIP sessions may then be communicated directly between the access point 102 and the audio endpoint device 118 using wireless links between the devices, for example WLAN and/or WPAN links. In some embodiments of the invention, the access point 102 may also provide VoIP servicing to the cellular device 116, where connections between the cellular device 116 and the cellular network 112 may not be available or desired.

In an exemplary embodiment of the invention, the cellular device 116 may also be utilized to provide VoIP servicing similar to what may be provided by the access point 102. The cellular device 116 may also be operable to route packets transmitted and/or received by the audio endpoint device 118 via the cellular network 112. Data communication between the cellular device 116 and the audio endpoint device 118 may be the performed via wireless links, which may comprise WLAN and/or WPAN links. The cellular device 116 may also perform some of the processing operations that would otherwise be performed during VoIP communication, substantially as described with regard to the access point 102. The cellular device 116 may also be utilized to route data and/or packets between the access point 102 and the audio endpoint device 118 during VoIP servicing by the access point 102 where direct links between the access point 102 and the audio endpoint device 118 may not be available or desirable.

Figure 1B:
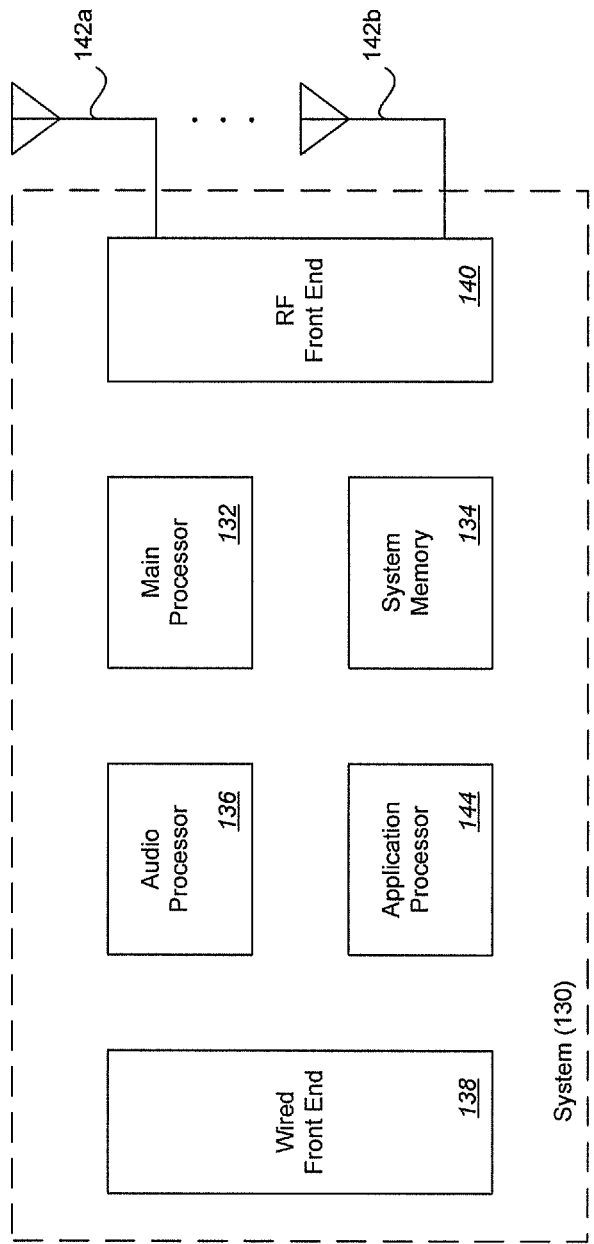
FIG. 1B is a block diagram that illustrates an exemplary communication system that enables providing VoIP access point servicing, in accordance with an embodiment of the invention.

FIG. 1B is a block diagram that illustrates an exemplary communication system that enables providing VoIP access point servicing, in accordance with an embodiment of the invention. Referring to FIG. 2, there is show a system 130 comprising a main processor 132, a system memory 134, an audio processor 136, a wired front-end 138, a RF front-end 140, a plurality of antennas 142a, . . . , 142b, an and an application processor 144.

The main processor 132 may comprise suitable logic, circuitry, code, and/or interfaces that may enable processing data and/or controlling operations of the system 130. In this regard, the main processor 132 may be enabled to provide control signals to the various other components and/or modules within the system 130. The main processor 132 may also control transfer of data between various portions of the system 130. Additionally, the main processor 132 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the system memory 134, the audio processor 136, the wired front-end 138, and/or the RF front-end 140, to enable, for example, supporting VoIP servicing operations. In some embodiments of the invention, at least some of the applications may be performed by a dedicated processor, the application processor 144.

The system memory 134 may comprise suitable logic, circuitry, code, and/or interfaces that may enable storage and/or retrieval of data. The system memory 134 may be operable to enable buffering data during operation of the system 130, and/or may be utilized to store and retrieve information and/or code that may effectuate the operation of the system 130. The information and/or code may comprise configuration data and/or parameters, software, and/or firmware, but the information and/or code need not be limited in this regard.

The audio processor 136 may comprise suitable logic, circuitry, code, and/or interfaces operable to perform signal processing operations to facilitate communication of voice data via one or more wired and/or wireless interfaces, which may be supported via the wired front-end 138 and/or the RF front-end 140. In various embodiments of the invention, the audio processor 136 may encode, decode, transcode, modulate, demodulate, encrypt, decrypt, scramble, descramble, and/or otherwise process signals transmitted and/or received via the system 130. In various embodiments of the invention, the audio processor 136 may be operable to adjust a modulation scheme, error coding scheme, and/or data rates of transmitted signals.

The RF front-end 140 may comprise suitable logic, circuitry, code, and/or interfaces that may be operable to perform RF transmission and/or reception, utilizing a plurality of antennas and/or frequency bands. The RF front-end 140 may be operable to utilize the plurality of antennas 142a, . . . , 142b to support RF communication corresponding to various wireless communication protocols. In this regard, the RF front-end 140 may be operable to perform RF transmission and/or reception of signals, via the plurality of antennas 142a, . . . , 142b, comprising data and/or control packets during Bluetooth, WLAN, WiMAX, and/or FM communications in the system 130. Each of the plurality of antennas 142a, . . . , 142b may comprise suitable logic, circuitry and/or code that enable transmission and/or reception of RF signals within certain bandwidths. For example, one or more of the plurality of antennas 142a, . . . , 142b may enable RF transmission and/or reception via the 2.4 GHz, which is suitable for WiMAX, Bluetooth and/or WLAN RF transmissions and/or receptions.

The wired front-end 138 may comprise suitable logic, circuitry, code, and/or interfaces that may be operable to communicate data in adherence to one or more wired protocols supported via the system 130. The wired front-end 138 may be operable to perform amplification, down-conversion, filtering, demodulation, and analog to digital conversion of received signals. The wired front-end 138 may also be operable to perform amplification, up-conversion, filtering, modulation, and digital to analog conversion of transmitted signals. The wired front-end 138 may enable communicating data, for example, T1/E1 lines, optical fibers (e.g., XPON), DSL, and/or Ethernet connections.

In operation, the system 130 may correspond to, or be integrated in the access point 102 to enable performing various operations substantially as described with regard to FIG. 1A. The system 130 may enable transmitting and/or receiving data over one or more wired and/or wireless interfaces. For example, the system 130 may be integrated within the access point 102 to enable supporting of wireless links that may be utilized to provide network access to the wireless network 104 and/or the land-based telephony network 106. In this regard, the system 130 may enable wired based communication between the access point 102 and the wireless network 104 and/or the land-based telephony network 106 via the wired front-end 138. The system 130 may provide RF support, via the RF front-end 140 and the plurality of antennas 142a, . . . , 142b, to provide WiFi links, to enable communication between the access point 102 and the audio endpoint device 118 and/or the cellular device 116, for example. The main processor 132, the system memory 134, and/or the audio processor 136 may be utilized to enable processing, managing, and/or buffering received and/or transmitted data. For example, the main processor 132, the system memory 134, and/or the audio processor 136 may enable extraction of data received via a wired and/or wireless interfaces supported via the system 130, and may then enable processing the extracted data to enable transmission via different wired and/or wireless interfaces.

In an exemplary aspect of the invention, the system 130 may be enabled to perform at least some of the processing otherwise performed via endpoint devices during VoIP communication. For example, VoIP communication may require performing telephony and/or networking operations to facilitate establishment of connections that enable exchange of IP packets carrying the audio data between the peers in the VoIP call. Accordingly, the main processor 132, the system memory 134, and/or the application processor 144, for example, may be utilized to perform these telephony and/or networking operations. In the uplink direction, the main processor 132, the application processor 144, the system memory 134, and/or the audio processor 136 may enable receiving audio data, from the endpoint device 118 for example, via the RF front-end 140, and one or more of the plurality of antennas 142a, . . . , 142b. The main processor 132, the application processor 144, the system memory 134, and/or the audio processor 136 may then be utilized to generate and/or process IP packets which may carry the received audio data. The IP packets may then be transmitted via the wired front-end 138 and/or the RF front-end 140. In the downlink direction, IP packets carrying audio data may also be received in the system 130, via the wired front-end 138 and/or the RF front-end 140. The main processor 132, the application processor 144, the system memory 134, and/or the audio processor 136 may then be utilized to process the received IP packets to extract audio data which may be communicated to the endpoint device 118 via the RF front-end 140, and one or more of the plurality of antennas 142a, . . . , 142b.

Figure 2A:
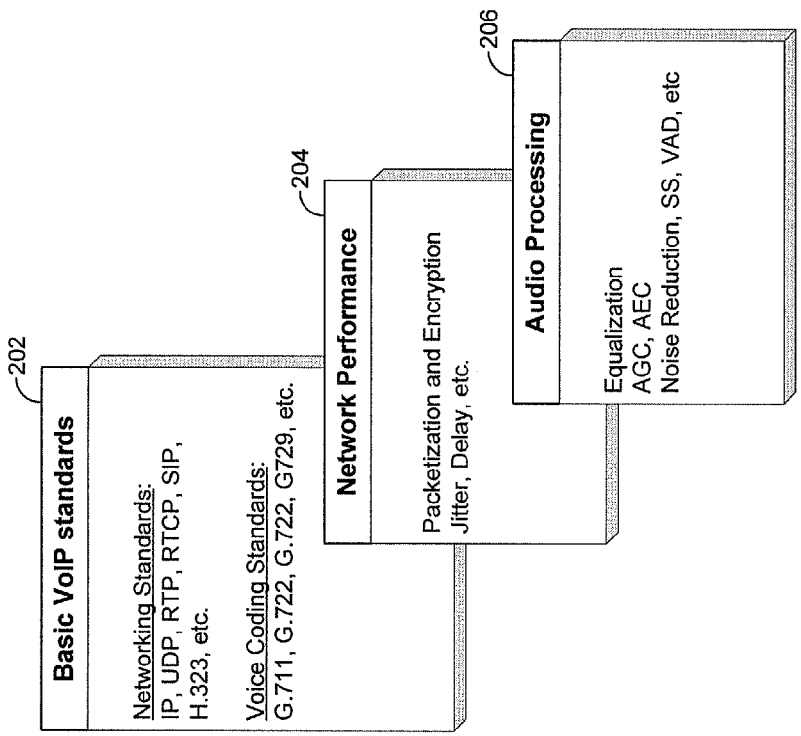
FIG. 2A is a diagram that illustrates grouping of processing operations performed during VoIP, which may be utilized in accordance with an embodiment of the invention.

FIG. 2A is a diagram that illustrates grouping of processing operations performed during VoIP, which may be utilized in accordance with an embodiment of the invention. Referring to FIG. 2A, there is shown processing groups 202, 204, and 206 representing various processing operations that may be performed during voice-over-IP (VoIP) based communications. Group 202 may comprise processing operations corresponding to networking standards, which may be utilized during generation, communication, and/or processing of network packets carrying VoIP data. Exemplary networking standards may comprise the Internet Protocol (IP), the User Datagram Protocol (UDP), the Real-time Transport Protocol (RTP), the RTP Control Protocol (RTCP), the Session Initiation Protocol (SIP), and/or the H.323 standard, which addresses call signaling and control, multimedia transport and control, and bandwidth control for point-to-point and multi-point conferences. Group 202 may also comprise processing operations corresponding to voice coding standards, which may be utilized to compress and/or decompress audio data that may be written into the network packets. Exemplary voice compression standards may comprise G.711, G.722, G.726, and/or G.729, which utilized various pulse-code modulation based schemes to compress audio information into bit strings. Group 204 may comprise network performance related processing operations, including, for example, packetization, encryption/decryption, and/or determining and/or mitigating performance degradation parameters, which may include delay, low data rates, and/or jitter. Group 204 processing operation may enable adjustment of characteristics of communicated packets to improve performance of VoIP communication, based on predetermined criteria and/or user specified parameters. Group 206 may comprise audio processing operations that may be performed during capture and/or playback of audio data communicated during VoIP sessions. Exemplary operations may comprise voice activity detection (VAD), audio and/or microphone equalization, silence suppression (SS), automatic gain control (AGC) processing, acoustic echo canceller (AEC) processing, and/or noise reduction.

In operation, processing operations of groups 202, 204, and/or 206 may be performed to facilitate VoIP communication in an endpoint device. For example, audio endpoint device 118 may be operable to establish VoIP sessions such that audio data may be communicated via IP packets transmitted from and/or received in the audio endpoint device 118. The processing operations of group 206 may be performed, using suitable logic, hardware and/or software in the audio endpoint device 118 to enable capturing and/or playing back audio streams. Similarly, the processing operations of group 202 may be performed to enable generating and/or processing IP packets communicated during the VoIP sessions, and to enable compressing and/or decompressing the audio streams to and/or from corresponding data that may be communicated via the IP packets. The processing operations of group 204 may similarly be performed to monitor, manage, and/or adjust various parameters and/or operation of the VoIP communication. For example, audio and/or network related parameters, including jitter, delay, and/or bitrates may be monitored and/or managed during the VoIP communication.

In an exemplary aspect of the inventions, at least some of the processing operations of groups 202, 204, and/or 206 may be delegated from an endpoint device participating in VoIP communication to device servicing the endpoint device during the VoIP communication. For example, during VoIP based communication via the audio endpoint device 118, some of the processing operations may be performed in the access point 102. The access point 102 may be operable, for example, to perform some of the networking and/or telephony related operations of groups 202 and/or 204. In some embodiments of the invention, the access point device 102 may also be operable to perform VoIP based voice coding standards based processing operations of group 202. Division of processing operation between endpoint devices and access points may be predetermined. For example, each of the end point 118 and/or the access 102 may be preprogrammed to perform a subset of the processing operations of groups 202, 204, and/or 206. Alternatively, the endpoint device 118 and the access point 102 may negotiate division of processing operations. The negotiated divison of processing operations may be based on various parameters, including, for example, cost, compensation, and/or available processing resources in the access point 102. The divison of processing operations may be performed prior to start of VoIP communication, when links between the endpoint device 118 and the access point 102 are being set up for example. In some instances, divison of processing operation may also be adjusted, dynamically, during active VoIP communications.

Figure 2B:
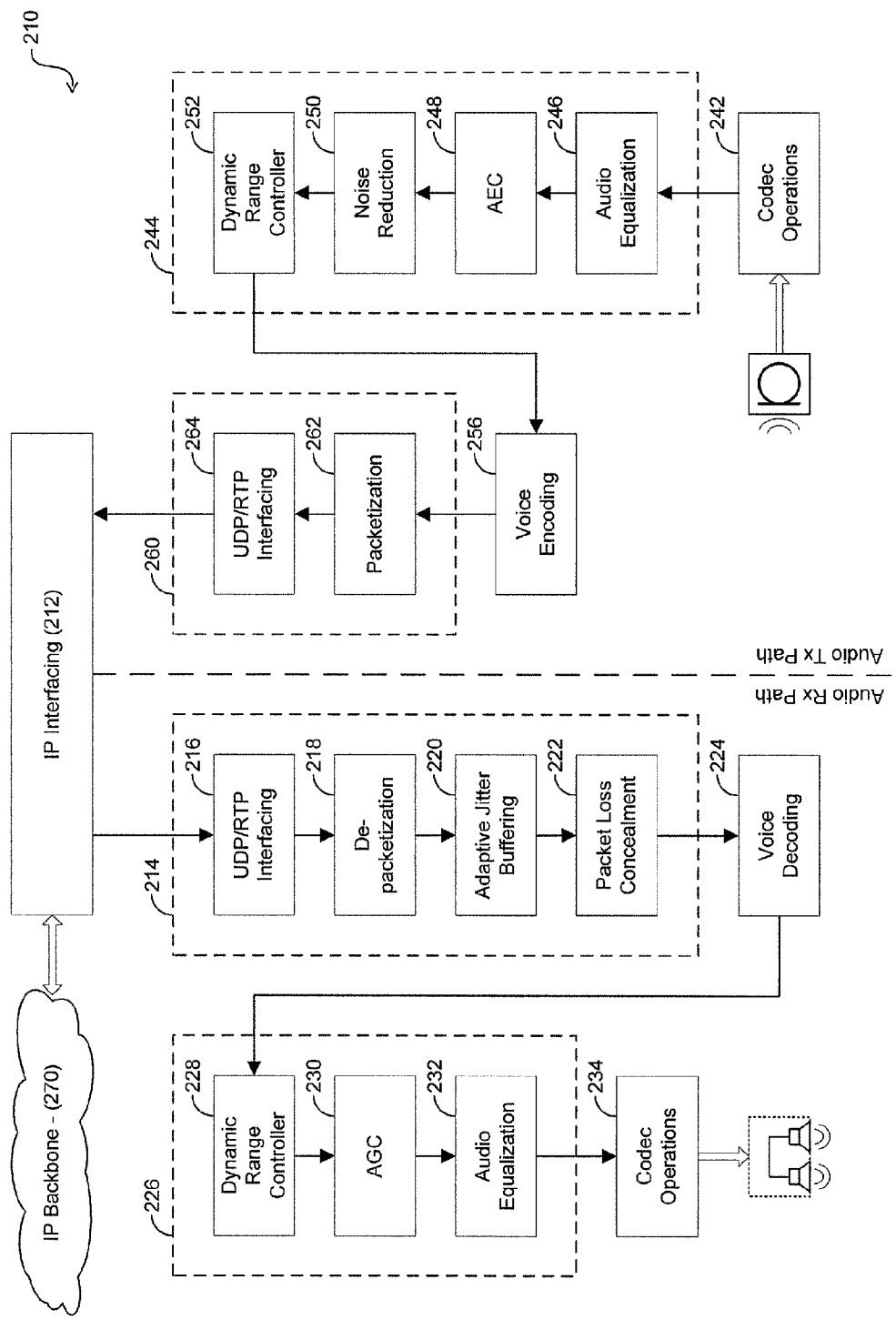
FIG. 2B is a diagram that illustrates exemplary processing steps during VoIP transmit and receive operations, which may be utilized in accordance with an embodiment of the invention.

FIG. 2B is a diagram that illustrates exemplary processing steps during VoIP transmit and receive operations, which may be utilized in accordance with an embodiment of the invention. Referring to FIG. 2B, there is show a flow 210 that may show exemplary processing sequences for both audio transmit and receive paths during VoIP based communications.

In the audio receive (Rx) path, IP packets carrying VoIP audio data may be received from the IP backbone 210 and processed to enable local playback of corresponding audio streams. The IP backbone 270 may comprise a plurality of networks and/or systems that may provide overall routing of IP packets between peers during IP based communication. The IP backbone 270 may correspond to one or more of the wireless network 104, the land-based telephony network 106, and/or the backbone network 110, substantially as described with regard to FIG. 1A. IP interfacing 212 may enable performing IP based processing by parsing, for example, IP headers in the received IP packets.

Networking Rx processing 214 may then enable performing additional networking and/or telephony related operations on the received packets. Networking Rx processing 214 may correspond to various processing operations from groups 202 and 204, substantially as described with regard to FIG. 2A, and may comprise, for example, UDP/RTP interfacing 216, de-packetization 218, adaptive jitter buffering 220, and/or packet loss concealment 222. UDP/RTP interfacing 216 may enable performing UDP and/or RTP based processing. The UDP and RTP processing correspond to various transport related operations. The UDP protocol may provide general transmission and/or reception of packets with minimal guarantees of reliability, ordering, and data integrity, and is used irrespective of the type data carried. The RTP protocol may provide additional packet transport operations for communicating packetized audio and/or video data over the Internet. De-packetization 218 may comprise the received packets to extract payload data carried therein. The data may comprise compressed audio data, utilizing G.711 compression standard for example. During de-packetization, additional processes may also be performed, including decryption where the data is encrypted, for example. Adaptive jitter buffering 220 may enable buffering of received data to mitigate, for example, jitter effects which may be caused by delays in processing and/or communication of the audio data. Packet loss concealment 222 may then be utilized to mask loss of data that may have occurred due to packet loss and/or corruption during IP packet communication.

Once networking Rx processing 214 is complete, voice decoding 224 may be performed to decode audio data extracted from received packets. For example, G.711 algorithm may be used to decompress received audio data that may have been compressed by the transmitting peer.

The decoded audio data may then be processed through the audio Rx processing 226. The audio Rx processing 226 may correspond to various processing operations from group 206, substantially as described with regard to FIG. 2A, which may performed during reception of VoIP packets, and may comprise, for example, AGC processing 228, dynamic audio adjustments 230, and/or audio equalization 232. The AGC processing 228 may enable use of the AGC algorithms, for example, to boost low level audio signals and/or to scale down high level audio signals to produce a consistent received level. The dynamic audio adjustments 230, may enable adjusting playback of the audio dynamically, based on input from listener for example. Exemplary dynamic audio adjustments may comprise muting and/or volume adjustments. Audio equalization 232 may comprise use of various digital signal attenuation parameters and/or techniques to alter digitized audio signals corresponding to the received audio data.

Codec operations 234 may then be utilized to enable playback by generating, for example, analog signals, via digital-to-analog conversion, corresponding to the received audio data, which may be playable via local speaker system.

In the audio transmit (Tx) path, IP packets carrying VoIP audio data corresponding to audio streams captured locally may be generated and transmitted. Codec operations 242 may enable initial processing of audio streams captured local via microphone system for example. The Codec operations 242 may comprise, for example, analog-to-digital conversion. The digitized audio signals may then be subject to audio Tx processing 244. Audio Tx processing 226 may correspond to various processing operations from group 206, substantially as described with regard to FIG. 2A, which may performed during transmission of VoIP packets, and may comprise, for example, audio equalization 246, AEC processing 248, noise reduction 250, and/or dynamic audio adjustments 252. Audio equalization 246 may be substantially similar to audio equalization 232 performed during audio Tx processing 226; however, audio equalization parameters and/or techniques may be adjusted and/or modified to be suitable for performing transmission operations. The AEC processing 248 may enable use of AEC algorithms, for example, to remove and/or mitigate acoustic echo distortions that may occur during capture of audio streams. The noise reduction 250 may enable use of noise reduction algorithms to reduce and/or mitigate noise signals, for example background noise, which may have inadvertently been captured during capture of audio streams.

Once audio Tx processing 244 is complete, voice encoding 256 may be performed to encode the processed audio data corresponding to capture audio streams. The G.711 algorithm may be used, for example, to generate G.711 compressed data that may be packed into IP packets for transmission.

The encoded audio data may then be processed through the networking Tx processing 260. Networking Tx processing 260 may enable performing networking and/or telephony related operations, to enable generating packets that may be utilized to carry the VoIP data corresponding to the locally generated audio data. Networking Tx processing 260 may correspond to various processing operations from groups 202 and 204, substantially as described with regard to FIG. 2A, and may comprise, for example, packetization 262 and/or UDP/RTP interfacing 264. Packetization 262 may enable generation of data packets corresponding to compressed audio data. During packetization 262, additional operations may also be performed, including, for example, encryption. UDP/RTP interfacing 264 may enable performing UDP and/or RTP based processing. The UDP/RTP interfacing 264 may comprise, for example, generating and/or populating UDP and/or RTP headers that may enable the receiving endpoint to perform necessary transport related processing operations. IP interfacing 212 may then enable IP based processing to enable transmission of IP packets carrying the VoIP data, by generating, for example, IP headers. The IP packets may then be transmitted via the IP backbone 270.

In an exemplary aspect of the inventions, at least some of the processing steps of flow 210, both in the audio Tx path and the audio Rx path, may be delegated from the audio endpoint device 118 to the access point 102, substantially as described with regard to FIG. 2A.

Figure 3A:
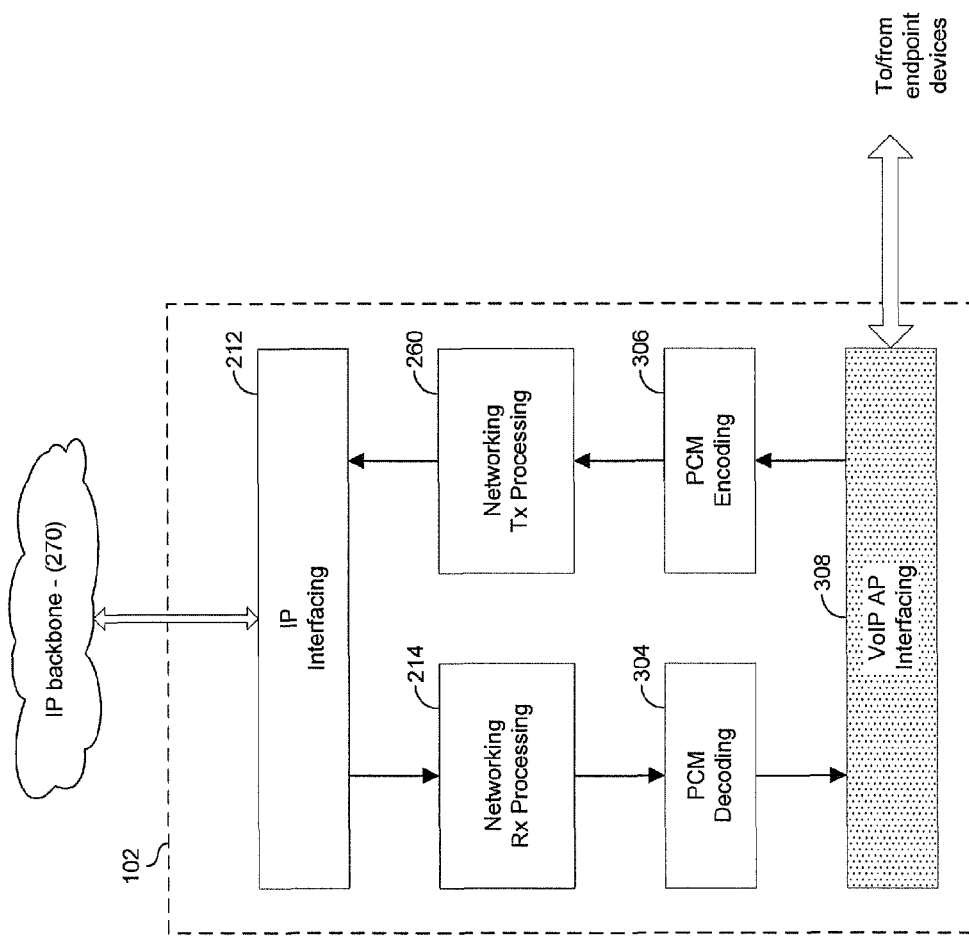
FIG. 3A is a diagram that illustrates exemplary networking and telephony processing performed in a VoIP access point, in accordance with an embodiment of the invention.

FIG. 3A is a diagram that illustrates exemplary networking and telephony processing performed in a VoIP access point, in accordance with an embodiment of the invention. Referring to FIG. 3A, there is shown the access point 102, substantially as described with regard to, for example, FIG. 1A. Also shown is IP backbone 270, substantially as described with regard to FIG. 2B.

In operation, the access point 102 may be utilized to service endpoint devices during VoIP communications by providing network connectivity, to the IP backbone 270 and/or by performing at least some of processing operations necessary to facilitate VoIP communication. The access point 102 may enable performing IP interfacing 212, substantially as described with regard to FIG. 2B, to enable reception and/or transmission of IP packets carrying audio data during the VoIP communications and performing IP related processing operations. In the downlink direction, the access point 102 may also perform networking Rx processing 214, substantially as described with regard to FIG. 2B. The PCM decoding 304 may enable decoding audio data which may be extracted from received IP packets during networking Rx processing 214. The PCM decoding 304 may enable extracting decoded audio data which may have been compressed using one or more PCM based schemes, including G.711 for example. The decoded audio data may then be communicated via the VoIP access point (AP) interfacing 308. The VoIP AP interfacing 308 may correspond to functionality and/or subsystems in the access point 102 that may enable transmission and/or reception of data in the access point 102, over wireless links for example. The VoIP AP interfacing 308 may represent, for example, use of the system 130 to enable data communication via the RF front-end 140 and one or more of the plurality of antennas 142a, . . . , 142b, over Bluetooth and/or WiFi links.

In the uplink direction, the VoIP AP interfacing 308 may enable reception of audio data via wireless links. The received audio data may then be sent through PCM encoding 306 to generated encoded data based on one or more PCM based compression standards for example. The encoded data may then be processed through the networking Tx processing 260, substantially as described with regard to FIG. 2B, to generate packets carrying the received audio data after it had been processed and encoded. The IP interfacing 212 may then performed to enable transmission of IP packets carrying the VoIP data via the IP backbone 270.

Figure 3B:
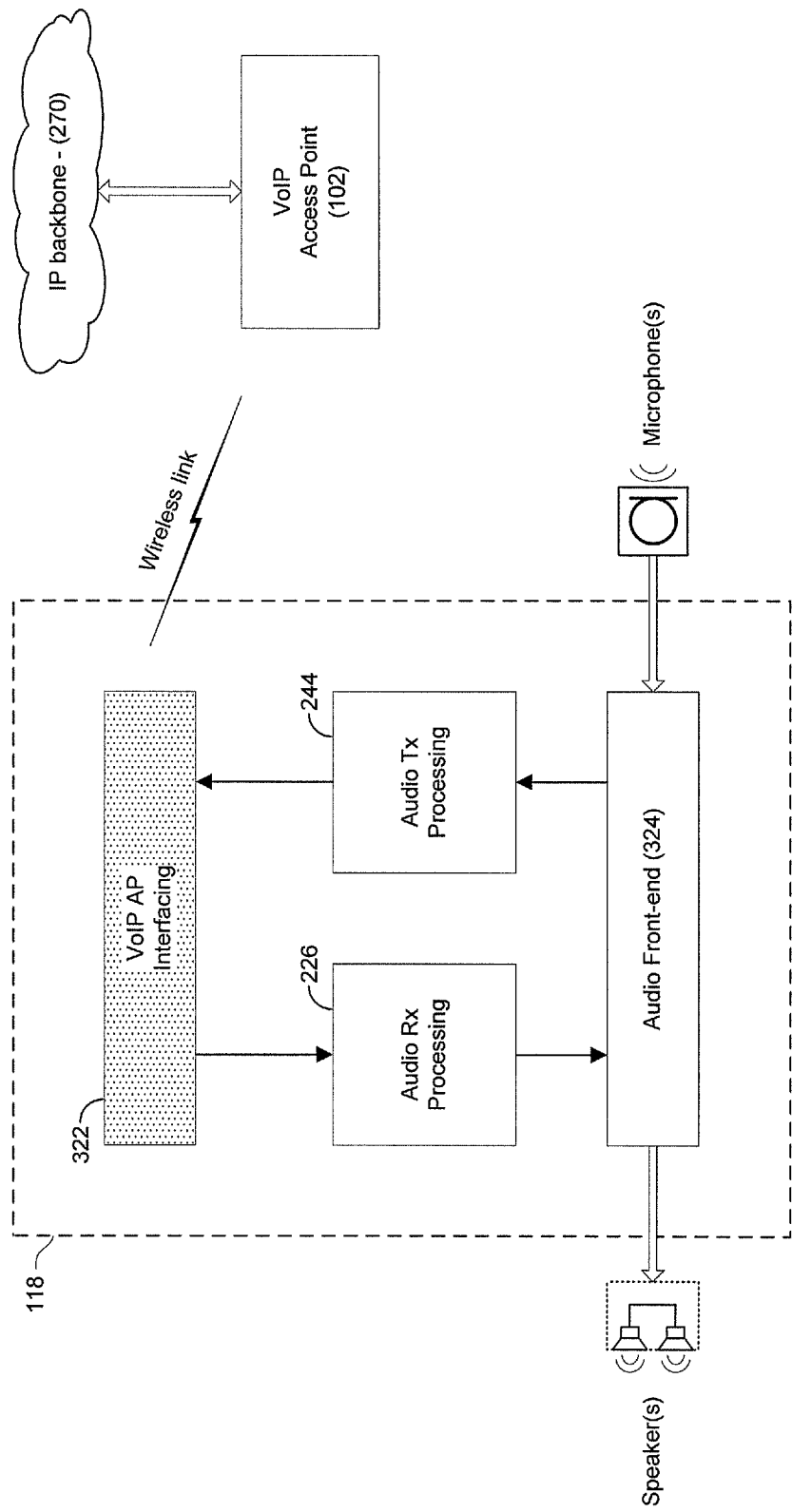
FIG. 3B is a diagram that illustrates exemplary audio processing operations performed in an audio endpoint device during servicing operations by a VoIP access point, in accordance with an embodiment of the invention.

FIG. 3B is a diagram that illustrates exemplary audio processing operations performed in an audio endpoint device during servicing operations by a VoIP access point, in accordance with an embodiment of the invention. Referring to FIG. 3B, there is shown the access point 102, the IP backbone 270, and the audio endpoint device 118. Also shown is an audio front-end 324. The audio front-end 324 may correspond to suitable functionality and/or subsystems in the audio endpoint device 118 that may enable capturing and/or playing back audio streams.

In operation, the access point 102 may be utilized to service the audio endpoint device 118 during VoIP communications by providing network connectivity, to the IP backbone 270, and by performing some of the processing operations necessary to facilitate VoIP communication. In the uplink direction, the audio endpoint device 118 may be operable to generate audio data that may be transmitted during VoIP communication. The audio front-end 324 may enable capturing audio streams, via microphone system for example. The audio front-end 324 may also enable performing initial codec processing operations, comprising, for example, analog-to-digital conversions. The digitized audio data may then be processed via the audio Tx processing 244, substantially as described with regard to FIG. 2B. The processed audio data may then be communicated to the access point 102 via VoIP AP interfacing 322, which may correspond to suitable functionality and/or subsystems in the audio endpoint 118 that enable connecting to and/or communicating with the access point 102 via one or more wireless links, substantially as described with regard to FIG. 1A. Once the audio data is received via the access point 102, the access point 102 may be utilized to perform remaining VoIP processing operations, substantially as described with regard to FIG. 3A, to enable transmitting IP packet carry VoIP data via the IP backbone 270.

In the downlink direction, VoIP AP interfacing 322 may enable reception of audio data in the audio endpoint device 118 from the access point 112, via one or more wireless links. The received audio data may then be processed through the audio Rx processing 226, substantially as described with regard to the FIG. 2B. The audio front-end 324 may enable playback of corresponding audio streams by generating, for example, analog signals, via digital-to-analog conversions, corresponding to the received audio data, which may be playable via local speaker system.

Figure 3C:
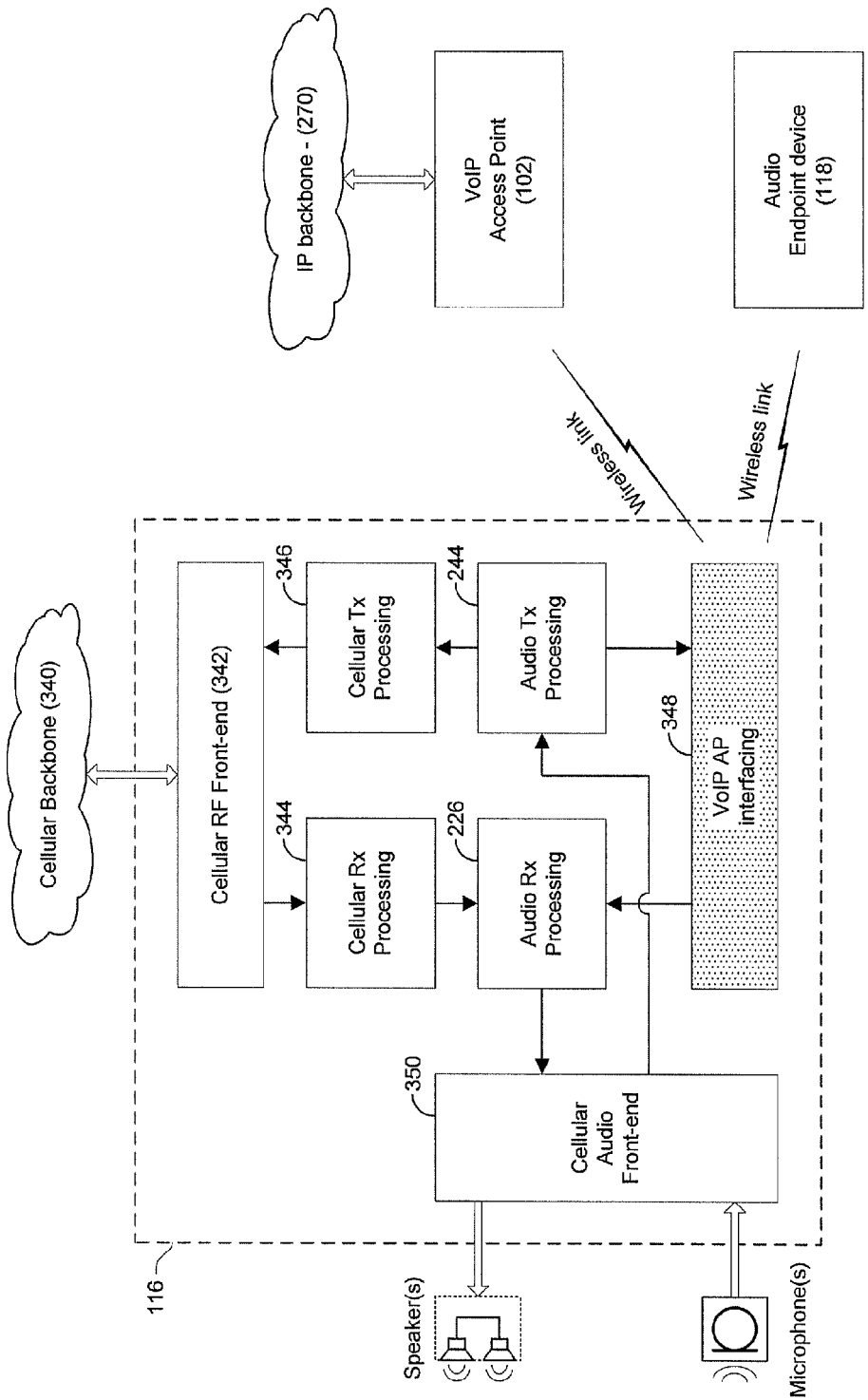
FIG. 3C is a diagram that illustrates exemplary VoIP access point support during processing in cellular device, in accordance with an embodiment of the invention.

FIG. 3C is a diagram that illustrates exemplary VoIP access point support during processing in cellular device, in accordance with an embodiment of the invention. Referring to FIG. 3C, there is shown the access point 102, the audio endpoint device 118, the IP backbone 270, and the cellular device 116. Also shown in FIG. 3C are a cellular backbone 340, a cellular RF front-end 342, and a cellular audio front-end 350. The cellular backbone 340 may correspond to the cellular network 112 and/or the cellular transceiver 114, which may be operable to provide network connectivity in the cellular device 116 via cellular links. The cellular RF front-end 342 may comprise suitable logic, circuitry, code, and/or interfaces that may enable RF transmission and/or reception based on one or more cellular protocols. The cellular audio front-end 350 may correspond to suitable functionality and/or subsystems in the cellular device 116 that may enable capturing and/or playing back audio streams, during voice calls in the cellular device 116 for example.

In operation, the cellular device 116 may be operable to support voice calls. In the uplink direction, the cellular audio front-end 350 may enable capturing audio streams, via a microphone subsystem for example. The cellular audio front-end 350 may also be operable to perform initial processing, comprising, for example, analog-to-digital conversions, to enable digital signal processing. The digitized audio signals may then be processed, by performing processing steps similar to the steps of the audio Tx processing 244, substantially as described with regard to FIG. 2A, for example. The processed audio data may then be sent via cellular Tx processing 346 to enable communication via cellular links. The cellular Tx processing 346 may comprise a plurality of processing operations that may be specific to the desired cellular interface, including, for example, voice encoding and/or modulation. The cellular RF interface 342 may then be used to communicate the properly formatted messaging carrying the audio data to the cellular backbone 340.

In the downlink direction, the cellular RF front-end 342 may enable receiving of messages from the cellular backbone 340 via cellular links, which may carry audio data. The received messages may be processed, via cellular Rx processing 344, to enable extracting audio data. The cellular Tx processing 344 may comprise a plurality of processing operations that may be specific to the cellular interface utilized to receive messaging from the cellular backbone 340, including, for example, demodulation and/or voice decoding. The extracted audio data may then be processed, by performing processing steps similar to the steps of the audio Rx processing 226, substantially as described with regard to FIG. 2A, for example. The cellular audio front-end 350 may then be utilized to playback corresponding audio streams by generating, for example, analog signals, utilizing digital-to-analog conversions, corresponding to the received audio data, which may be playable via a speaker subsystem.

In various exemplary aspects of the invention, the cellular device 116 may be operable to participate in VoIP servicing operations. The cellular device 116 may comprise VoIP access point (AP) interfacing 348, which may correspond to suitable functionality and/or subsystems in the cellular device 116 that may enable connecting to and/or interacting with the access point 102 and/or the audio endpoint device 118 via one or more wireless links, substantially as described with regard to FIG. 1A. Exemplary wireless links that may be supported via the VoIP AP interfacing 348 may comprise Bluetooth and/or WiFi links. The VoIP AP interfacing 348 may also enable communication between the cellular device 116 and the audio endpoint device 118. The cellular device 116 may be utilized, for example, as an intermediary device that may enable routing of messages and/or data between the access point 102 and the audio endpoint device 118. In this regard, the routed messages and/or data may be received and retransmitted via the VoIP AP interfacing 348, for example, with no or minimal processing with the cellular device 116.

The cellular device 116 may also be utilized as an endpoint device that may be serviced by the access point 102. In this regard, audio data may be communicated between the cellular device 116 and the access point 102, via the VoIP AP interfacing 348. Audio Rx processing 226 and audio Tx processing 244 may enable performing necessary processing operations, substantially as described with regard to FIG. 2B, during audio data reception and transmission, respectively. The cellular audio front-end 350 may be operable to enable capturing and/or playing back corresponding audio streams. In some embodiments, the cellular device 116 may also be utilized to provide VoIP access point servicing. In this regard, some of the processing operations performed during VoIP communications may be performed within the cellular device 116. For example, the cellular Rx processing 344 and/or the cellular Tx processing 346 may be modified and/or configured to enable performing networking related processing operations comprising steps similar to the steps of the networking Tx processing 214 and/or networking Tx processing 260, for example, substantially as described with regard to FIG. 2A, and/or PCM based encoding and/or decoding. Audio data may be communicated between the cellular device 116 and the audio endpoint device 118 via the VoIP AP processing 348, over wireless links for example.

Figure 4:
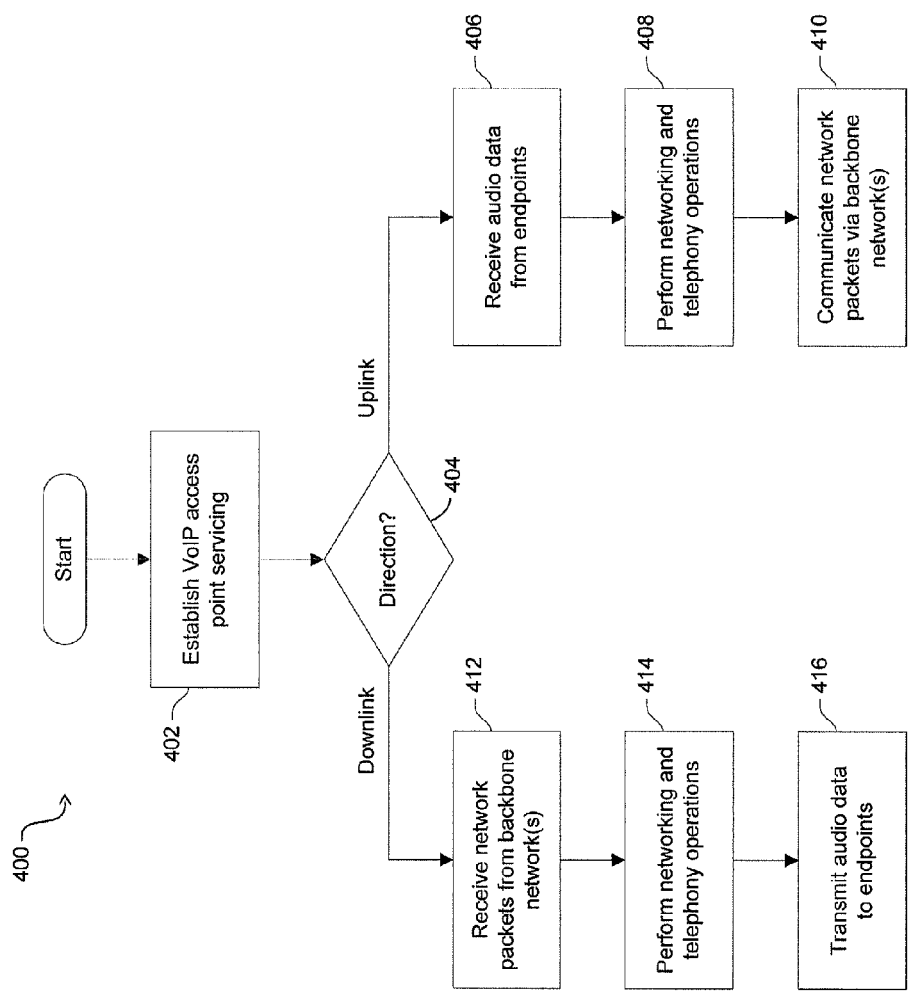
FIG. 4 is a flow chart that illustrates VoIP access convergence in a mobile device, in accordance with an embodiment of the invention.

FIG. 4 is a flow chart that illustrates VoIP access convergence in a mobile device, in accordance with an embodiment of the invention. Referring to FIG. 4, there is shown a flow chart 400 comprising a plurality of exemplary steps, which may enable use of access point to service VoIP communications by endpoint devices.

In step 402, VoIP servicing may be established via an access point. For example, VoIP servicing via the access point 102 may be established. The VoIP servicing may be preprogrammed into the access point 102, and/or may be requested and negotiated for by the audio endpoint device 118. Accordingly, the access point 102 may operable to perform at least a subset of processing operations otherwise performed wholly by the audio endpoint device 118. In step 404, a determination of the direction of data routing via the access point during VoIP communication may be performed. During uplink data routing, the exemplary steps may proceed to step 406. In step 406, audio data may be received in the access point 102 from the audio endpoint device 118, via wireless links for example. In step 408 networking and/or telephony operations may be performed on received audio data via the access point 102. These operations may comprise, for example, PCM encoding, encryption, packetization, and/or generation of transport and/or IP headers and/or parameters. In step 410, IP packets carrying the VoIP data may be transmitted by the access point 102, via the IP backbone 270 for example.

Returning to step 404, during downlink routing of data, the exemplary steps may proceed to step 412. In step 412, IP packets carrying the VoIP data may be received by the access point 102, from the IP backbone 270 for example. In step 414, networking and/or telephony operations may be performed on received IP packets. These operations may comprise, for example, IP and/or transport headers and/or parameters parsing and/or processing, de-packetization, decryption, and/or PCM decoding. In step 416, audio data extracted in the access point 102 from received IP packets may be transmitted to the audio endpoint device 118, via wireless links for example.

Various embodiments of the invention may comprise a method and system for endpoint based architecture for VoIP access points. The access point 102 may be operable to provide voice-over-IP (VoIP) service to the audio endpoint device 118. At least some of the processing that may need to be performed via the audio endpoint device 118 during VoIP communications may be performed by the access point 102. For example, the access point 102 may be operable, in the downlink direction, to extract VoIP audio data received via IP packets, and to communicate the extracted audio data as non-VoIP formatted data to the audio endpoint device 118. Communications between the access point 102 and the audio endpoint device 118 may be performed via one or more wireless interfaces, which may comprise Bluetooth, ZigBee, WLAN, and/or WiMAX interfaces. In the uplink direction, the access point 102 may be operable to receive non-VoIP formatted audio data from the audio endpoint device 118, and may pack the received data into IP packets for VoIP communication. The access point 102 may also be operable to perform PCM based encoding/decoding operations during VoIP servicing operations via the access point 102. The audio endpoint device 118 may perform audio processing during VoIP communications via the access point 102, comprising audio equalization 232 and/or 246, dynamic audio adjustments 230 and/or 252, AGC processing 228, AEC processing 248, and/or noise reduction 250. The cellular device 116 may be operable to route messages between the access point 102 and the audio endpoint device 118, using Bluetooth and/or WLAN interfaces between the cellular device 116 and the access point 102, and between the cellular device 116 and the serviced audio endpoint device 118.

Another embodiment of the invention may provide a machine, and/or computer readable storage, and/or medium, having stored thereon, a machine code, and/or a computer program having at least one code section executable by a machine, and/or a computer, thereby causing the machine, and/or computer to perform the steps as described herein for endpoint based architecture for VoIP access points.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, comprising:
receiving, at an access point:
voice-over-IP (VoIP) data from a communication device over a first network, the access point and a wireless endpoint device functionally cooperating to process audio data included in the VoIP data in a distributed manner; and
a communication from the wireless endpoint device over the first network indicating a subset of processing functions, as delegated by the wireless endpoint device from among a plurality of processing functions, to be performed, at the access point, wherein the subset of processing functions is otherwise performed by the wireless endpoint device;
extracting, in the access point, the audio data included in the VoIP data;
processing, in the access point, the extracted audio data utilizing the subset of processing functions to generate processed audio data; and
communicating, from the access point, the processed audio data as non-VoIP formatted audio data to the wireless endpoint device over a second network, the second network being different from the first network, wherein the second network is a wireless network.

2. The method according to claim 1, further comprising:
converting non-VoIP formatted audio data received from the wireless endpoint device into VoIP formatted data for communication to the communication device.

3. The method according to claim 1, wherein processing comprises:
encoding or decoding the extracted audio data within the access point using a pulse-code modulation (PCM) standard.

4. The method according to claim 1, wherein communicating from the access point comprises:
communicating, using a wireless interface within the access point, the processed audio data as the non-VoIP formatted audio data.

5. The method according to claim 4, wherein communicating using the wireless interface comprises:
communicating, using a Bluetooth interface, a ZigBee interface, a WLAN interface, or a WiMAX interface, the processed audio data as the non-VoIP formatted audio data.

6. The method according to claim 1, wherein communicating from the access point comprises:
routing the processed audio data as the non-VoIP formatted audio data to an intermediary device over the second network then onto the wireless endpoint device.

7. The method according to claim 6, wherein routing comprises:
routing the processed audio data as the non-VoIP formatted audio data to a cellular device, the cellular device being configured to communicate directly with the access point and with the wireless endpoint device via a wireless interface.

8. The method according to claim 1, further comprising:
processing the non-VoIP formatted audio data utilizing a second subset of processing functions from among the plurality of processing functions, the second subset of processing functions including audio processing operations.

9. The method according to claim 8, wherein processing the non-VoIP formatted audio data utilizing the second subset of processing functions comprises:
processing the non-VoIP formatted audio data utilizing audio equalization, dynamic audio processing, automatic gain control (AGC) processing, Acoustic Echo Canceler (AEC) processing, or noise reduction.

10. An access point for functionally cooperating with a wireless endpoint device to process audio data included in voice-over-IP (VoIP) data in a distributed manner, comprising:
a receiver configured:
to receive the VoIP data from a communication device over a first network, and
to receive communication from the wireless endpoint device over the first network indicating a subset of processing functions, as delegated by the wireless endpoint device from among a plurality of processing functions, to be performed at the access point, wherein the subset of processing functions is otherwise performed by the wireless endpoint device;
a processor configured:
to extract the audio data included in the VoIP data, and
to process the extracted audio data utilizing the subset of processing functions to generate processed audio data; and
a transmitter configured to communicate the processed audio data as non-VoIP formatted audio data to the wireless endpoint device over a second network, wherein the second network is a wireless network.

11. The access point according to claim 10, wherein the processor is further configured to convert non-VoIP formatted audio data received from the wireless endpoint device into VoIP formatted data for communication to the communication device.

12. The access point according to claim 10, wherein the processor is further configured to encode or decode the extracted audio data using a pulse-code modulation (PCM) standard.

13. The access point according to claim 10, wherein the transmitter comprises:
a wireless interface configured to communicate the processed audio data to the wireless endpoint device.

14. The access point according to claim 13, wherein the wireless interface comprises:
a Bluetooth interface;
a ZigBee interface;
a WLAN interface; or
a WiMAX interface.

15. The access point according to claim 10, wherein at least some communication between the access point and the wireless endpoint device is configured to be routed via an intermediary device.

16. The access point according to claim 15, wherein the intermediary device comprises:
   a cellular device configured to communicate directly with the access point and with the wireless endpoint device via a second wireless interface.

17. The access point according to claim 10, wherein the wireless endpoint device is configured to perform a second subset of processing functions from among the plurality of processing functions.

18. The access point according to claim 17, wherein the second subset of processing functions comprises:
   audio equalization;
   dynamic audio processing;
   automatic gain control (AGC) processing;
   Acoustic Echo Canceler (AEC) processing; or
   noise reduction.

19. A system for processing audio data included in voice-over-IP (VoIP) data in a distributed manner, comprising:
   a communication device;
   a wireless endpoint device; and
   an access point configured to be coupled to the communication device and to the wireless endpoint device via a first network and a second network, respectively, the first network being different from the second network, the access point including:
      a receiver configured:
         to receive the VoIP data from the communication device over the first network, and
         to receive a communication from the wireless endpoint device over the first network indicating a subset of processing functions, as delegated by the wireless endpoint device from among a plurality of processing functions, to be performed at the access point, wherein the subset of processing functions is otherwise performed by the wireless endpoint device; and
      a processor configured:
         to extract the audio data included in the VoIP data, and
         to process the extracted audio data utilizing the subset of processing functions to generate processed audio data, and
      a transmitter configured to communicate the processed audio data as non-VoIP formatted audio data to the wireless endpoint device over a second network, wherein the second network is a wireless network.

20. The system according to claim 19, wherein the wireless endpoint device is configured to perform a second subset of processing functions from among the plurality of processing functions, the second subset of processing functions comprising:
   audio equalization;
   dynamic audio processing;
   automatic gain control (AGC) processing;
   Acoustic Echo Canceler (AEC) processing; or
   noise reduction.

* * * * *